(No Model.) 3 Sheets—Sheet 1.
F. G. BECKER.
HARVESTER.
No. 317,964. Patented May 19, 1885.
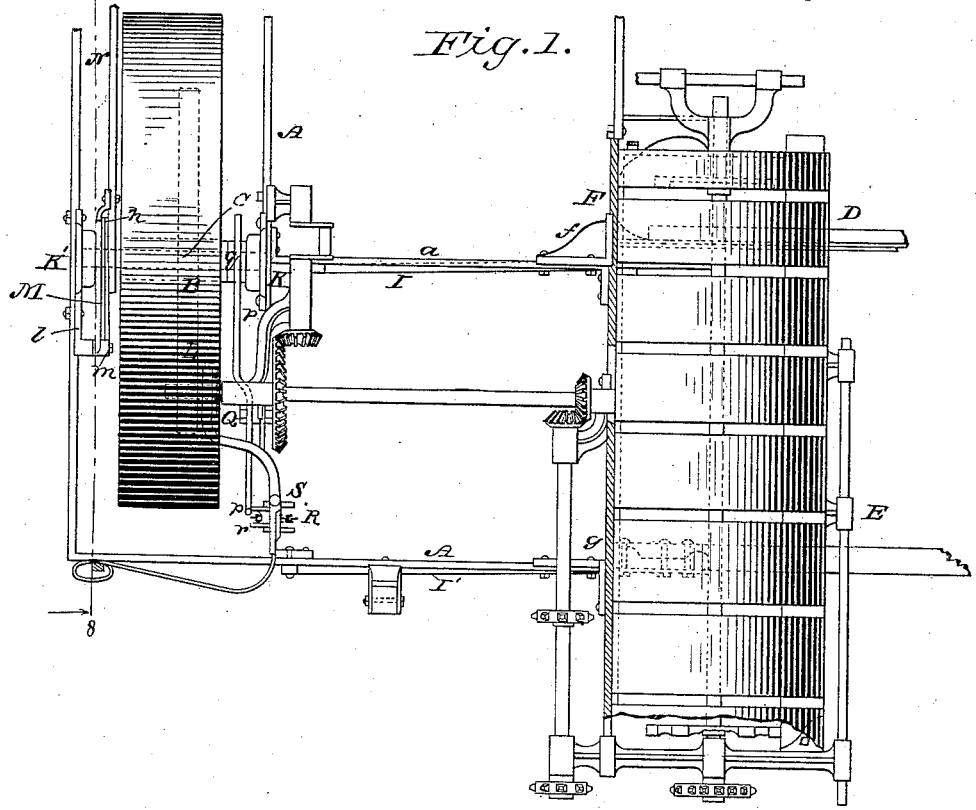
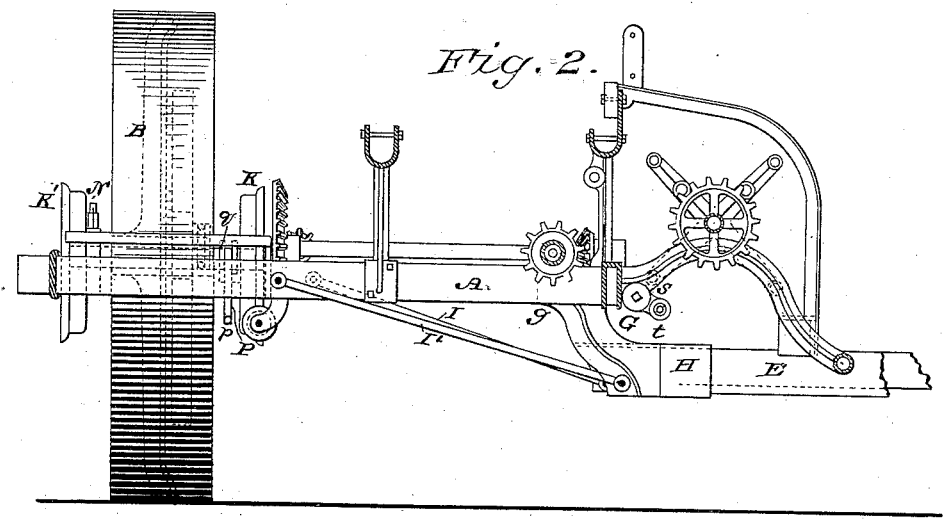
WITNESSES
Ed. A. Newman
Al. C. Newman
INVENTOR
Frederick G. Becker,
By his Attorneys (No Model.) 3 Sheets—Sheet 2.
F. G. BECKER.
HARVESTER.
No. 317,964. Patented May 19, 1885.
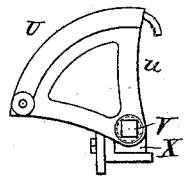
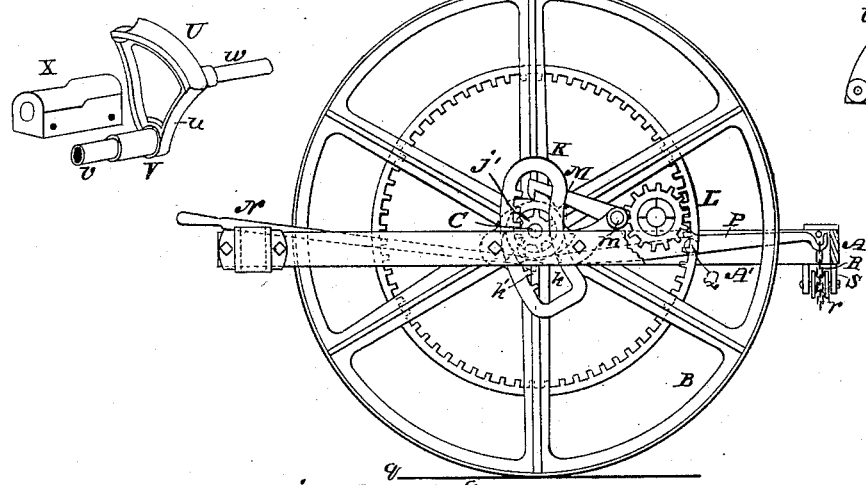
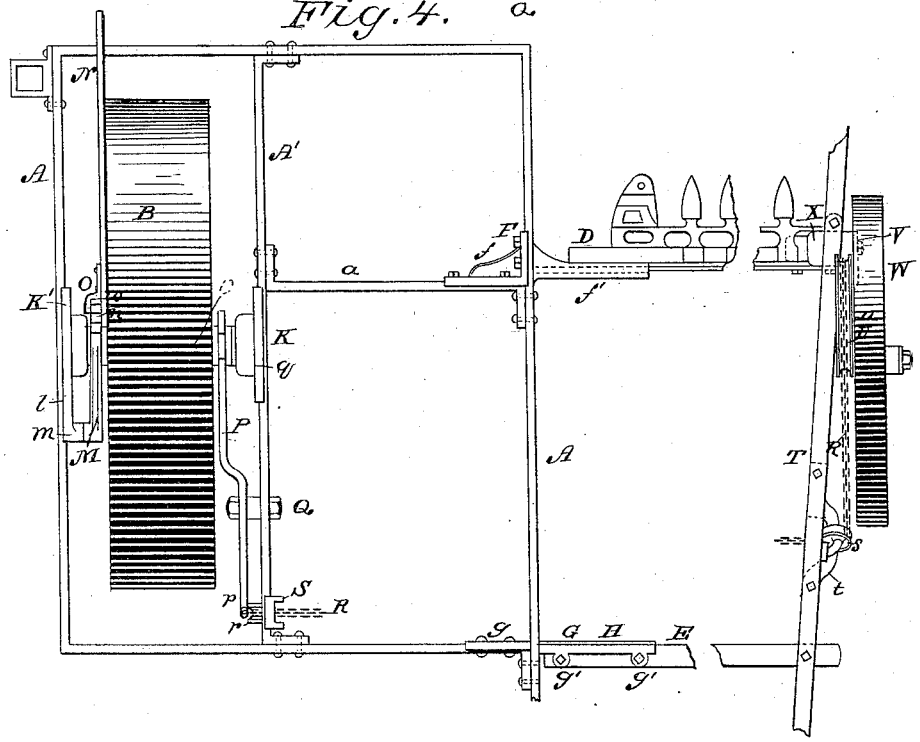
WITNESSES
Ed. A. Newman.
Al. C. Newman.
INVENTOR
Frederick G. Becker,
By his Attorneys (No Model.) 3 Sheets—Sheet 3.

F. G. BECKER.
HARVESTER.

No. 317,964. Patented May 19, 1885.

WITNESSES
James Young.
Lloyd B. Wight.

INVENTOR
Frederick G. Becker.
By his Attorneys

UNITED STATES PATENT OFFICE.

FREDERICK G. BECKER, OF BROCKPORT, NEW YORK, ASSIGNOR TO DAYTON S. MORGAN & CO., OF SAME PLACE.

HARVESTER.

SPECIFICATION forming part of Letters Patent No. 317,964, dated May 19, 1885.

Application filed June 28, 1884. (No model.)

*To all whom it may concern:*

Be it known that I, FREDERICK G. BECKER, of Brockport, in the county of Monroe and State of New York, have invented certain new and useful Improvements in Harvesters, of which the following is a specification.

My invention relates to improvements applicable to harvesters of the one-wheel class, particularly grain-binding harvesters; and my invention consists in certain novel features of construction and combinations of parts involving improvements in the main frame, and in the manner of connecting it with the finger-beam and frame of the grain-platform, and in means for vertically adjusting the main frame, and the grain-platform, and the finger-beam, at both their inner and outer ends, simultaneously and correspondingly.

In the accompanying drawings my improvements are illustrated as applied to a grain-binding harvester of well-known type, some features of the binding attachment being shown, though forming no part of my invention, together with those portions of the harvester proper, illustration of which is needed to convey a full understanding of the features constituting my improvements, and which may be employed in connection with the requisite co-operative parts of any suitable harvester.

Figure 8:
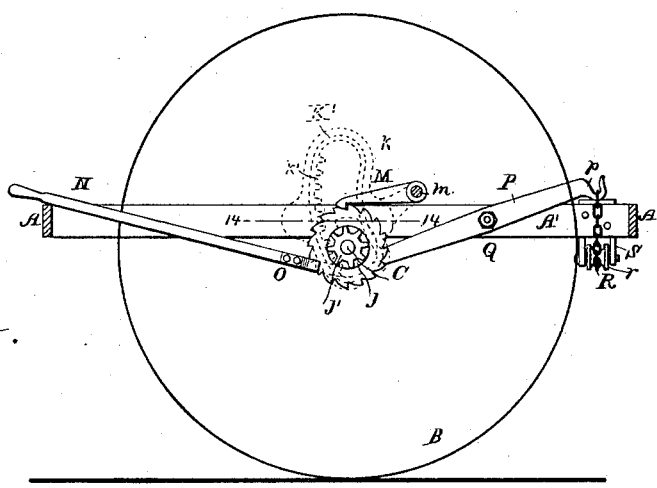
Figure 14:
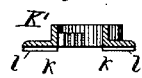
Figure 15:
Figure 13:
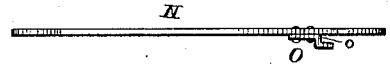
Figure 16:
Figure 9:
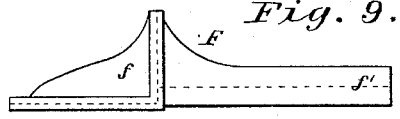
Figure 11:
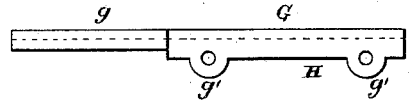
Figure 10:
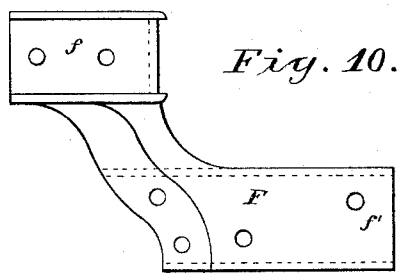
Figure 12:
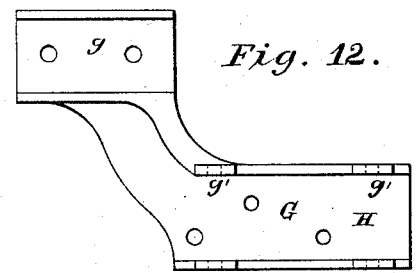

Figure 1 is a plan view, and Fig. 2 is a rear elevation, of the machine with many portions omitted or broken away. Fig. 3 is an elevation as seen from the outer or stubble side, parts being broken away. Fig. 4 is a plan view showing the main frame, the grain-platform frame, the raising and lowering devices, &c., various features being omitted. Fig. 5 is a detailed view designed to show the manner of supporting, beneath the axle, the forward end of the lever, which connects with the journal-bracket of the grain-wheel. Figs. 6 and 7 show in perspective, with the parts separated and in elevation, respectively, the journal-bracket, &c., of the grain-wheel. Fig. 8 is an elevation, partly in section, on the line 8 8 of Fig. 1, and with parts in dotted lines, showing portions of the raising and lowering mechanism in positions differing from those in which they are represented in Fig. 3. Figs. 9 and 10 are respectively a plan view and a rear elevation of a bracket by which the main frame and finger-beam are connected, and Figs. 11 and 12 are similar views of a bracket for connecting the main frame and the back beam of the grain-platform. Fig. 13 is a plan view of a ratchet-actuating lever. Fig. 14 is a horizontal section on the line 14 14 of Fig. 8, showing details of one of the racked bearing-brackets. Fig. 15 is a sectional view of the collared pinion and the ratchet, which are fastened to one end of the axle; and Fig. 16 a similar view of the collared pinion, which is secured to the other end of the axle.

A rectangular main frame is composed of three wrought-iron bars consisting of a main bar, A, an intermediate bar, A', and a brace bar, $a$. The main bar is bent into shape with its ends brought together at one corner of the frame, the rear inner corner, and united by rivets or bolts. The intermediate bar extends parallel to the sides of the main bar, is bent at right angles at its front and rear ends, and riveted or bolted to the inner surface of the main bar at its front and rear. The ends of the brace-bar $a$ are bent at right angles, one end being riveted or bolted to the intermediate bar, A', slightly in advance of its middle, and the other end similarly secured to that portion of the main bar A, which constitutes the inner side of the frame. As in this instance shown the main frame is made quite wide, so as to provide ample space inside the driving-wheel B for accumulating and compressing bundles of grain and binding them in suitable well-known way.

The driving-wheel is loose upon the axle C, which is adjustably connected with the outer side of the main frame and the intermediate bar thereof, as farther on to be fully described.

A finger-beam, D, and a back beam, E, of a suitable grain-platform frame are strongly and rigidly connected with the main frame in the following way: A finger-beam bracket, F, is fitted by its inwardly-projecting angular upper portion, $f$, to the main frame in the corner formed by the junction of the brace-bar $a$ and inner side portion of the main bar of the frame. The angular portion $f$ of this bracket is flanged at its upper and lower edges, so as to form seats or sockets for engaging the frame-bars, and serving, in connection with bolts and nuts, to secure the bracket in place, as will readily be understood. The lower outwardly-projecting portion, $f'$, of the bracket F is formed with flanges at its top and bottom edges, constituting a seat or socket to receive the heel end of the finger-beam, to which it is strongly bolted. A back beam-bracket, G, is formed with an inwardly-projecting flanged upper end, $g$, which fits against the inner surface of the rear portion of the main bar A, at the inner rear corner of the main frame, and embraces the upper and lower edges of this bar, to which it is bolted or riveted. The outwardly-projecting lower portion, H, of the back-beam bracket is provided at its upper and lower edges with perforated lugged flanges $g'$ $g'$. A seat or socket for the back beam is formed between these flanges and bolts, passing through the flange-lugs, and through the back beam, and nuts upon the bolts serve to securely fasten the bracket in place.

The connection with the main frame of the finger-beam and grain-platform by means of the brackets, as just described, is strengthened by bracing connection of the finger-beam and back beam with the main frame in the following way: A brace-rod, I, is bolted at its inner end to the frame brace-bar $a$, near the intermediate bar A' of the frame, and at its opposite end the brace-rod is bolted both to the finger-beam heel and the portion $f'$ of the finger-beam bracket. Another brace-rod, I', is bolted at one end to the back beam and the portion H of its bracket, and at its opposite end to the rear portion of the main bar A at its junction with the intermediate bar A' of the main frame.

From the above description it will be seen that a strong, simply-constructed, and light main frame is provided, and that the finger-beam and grain-platform are securely but detachably connected therewith, while the construction and connection of parts are such as to facilitate repairs by permitting of the ready removal and renewal of damaged portions.

The driving-wheel B is located within the main frame and between the intermediate bar and outer side portion thereof, and the axle C is adjustably connected with the main frame, as now to be described. The axle is provided at each end with a collared pinion. These pinions J J' are detachably fastened to the axle, and each is made with its teeth extending only part way across its periphery, thus leaving the annular untoothed portion or collar, $j$. The pinion J' is formed with a ratchet, $n$. The collars and ratchet may obviously be separate from the pinions.

Rack-toothed bearing-brackets K and K' are secured diametrically opposite to each other to the intermediate bar of the frame, and to the outer side portion of the main bar of the frame, respectively. These brackets are vertically curved and of centrally-open or loop form, their rear inner surfaces and the untoothed portions $k$ of their front inner surfaces constituting curved bearings for the collars $j$ of the axle-pinions. These bearings are curved concentrically with the axis of the pinion L, which meshes with the internal gear of the driving-pinion for a purpose which will presently become obvious. The vertically-extending curved row of teeth $k'$ of each bracket, K and K', forms a rack with which the pinion on the adjacent end of the axle meshes outside of or beyond the bearing-surfaces $k$ of the bracket. These rack-toothed bearing-brackets are secured to the main frame by suitable flanges, $l$ $l$, and bolts and nuts.

The securing-flange of the bracket K' is extended rearwardly and made to constitute a pivotal support, $m$, for a vertically-rocking pawl, M, which engages with the before-mentioned ratchet $n$, fast on the axle with one of the collared pinions. The ratchet is operated by a lever, N, which, as in this instance shown, instead of being provided with the usual spring-actuated ratchet-engaging device, is constructed and actuated as follows: The lever, which extends forward slightly beyond the main frame at its handle, is hooked or curved at its heel end and loosely embraces the axle, so that the lever may be moved endwise to an extent sufficient to cause the portion $o$ of its attached bracket O to become engaged with or disengaged from the ratchet. This bracket O is suitably attached to the lever, and embraces the ratchet, as usual, so as to prevent injurious sidewise motion of the lever.

From the above description it will readily be understood that by manipulating the lever N to roll the axle in one direction the main frame may be raised, that by manipulating both the lever and the ratchet-engaging pawl the frame may be lowered by the rolling of the axle in the opposite direction, that when properly adjusted the frame is held in position by the engagement of the pawl with the ratchet, that during adjustment of the frame the collars of the pinions on the axle roll up or down in their bearings in the brackets K K', and that engagement of the pinion L with the gear of the driving-wheel is not interfered with by adjustment of the frame.

In order that the grain-platform and finger-beam may be adjusted vertically throughout their lengths (at their outer as well as inner ends) simultaneously and correspondingly with the main frame, mechanism such as next to be described is provided.

A controlling-lever, P, for the grain-wheel W, has a hook, $p$, at its rear end, is secured by a pivot, Q, to the intermediate bar of the main frame, and at its front end projects beneath a collar, $q$, on the axle and into an annular recess in the collar. This annularly-recessed collar is loose on the axle. One end of a chain, R, is secured to the rear end of the lever P. This chain passes under a guide-pulley, $r$, mounted in a pendent bracket, S, secured to and near the rear end of the intermediate bar of the main frame; then along beneath the inner side of the main frame, beneath the grain platform; next under an inclined guide-pulley, s, mounted in a bracket, t, secured to the outer cross-piece or end bar, T, of the grain-platform frame, and at its outer end the chain is secured to a hook, u, at the forward end of a segment-sheave, U, over which it passes. This segment-sheave is formed with a rocking journal-bracket, V, upon the journal-arm w of which the grain-wheel W is mounted. The journal-bracket is pivotally mounted, by means of its spindle v, in a bearing-block, X, which is secured to the finger-beam by tap-bolts or in other well known and equivalent way.

From the above description it will readily be understood that when the main frame is raised (see Fig. 8) and the rear end of the grain-wheel controlling-lever elevated by the depression of its front end as acted upon by the axle the strain upon the journal-bracket by the chain tends to rock this bracket backward and downward, thus lifting the outer end of the grain-platform, &c., with the main frame, and that when the main frame is lowered (see Fig. 3) the weight of the parts supported by the grain-wheel tends to rock the journal-bracket upward and forward to the extent of the movement allowed it, thus lowering the grain-platform, &c., to the limit permitted by the upward movement of the forward end of the controlling-lever with the axle, and the consequent depression of its rear end.

I do not broadly claim either a sectional wrought-iron main frame, or the combination, with a main frame, of a finger-beam and grain-platform rigidly connected therewith, or the combination of the main frame, a finger-beam, and grain-platform rigidly connected therewith, and means for vertically adjusting these parts simultaneously and correspondingly, as I am aware that, unqualifiedly considered, such features are older than my improvements. Neither do I wish to be understood as confining my invention to the precise arrangement and particular construction of parts hereinbefore described, as the details of my improvements may be modified in various ways, and some of the essential features constituting my improvements be employed without the other parts described, or in connection with equivalents of such omitted parts.

I claim as of my own invention—

1. The rectangular main frame composed of the main bar bent into shape and having its ends united, the intermediate bar connected at its ends to the main bar at its front and rear, and the brace-bar connected at its ends with the intermediate bar and the inner side of the main bar, substantially as and for the purpose hereinbefore described.

2. The combination, with the main frame composed of the bent main bar, the intermediate bar, and the brace bar, of the finger-beam, the bracket secured to the finger-beam, and to the brace-bar and inner side of the main bar of the main frame, the back beam of the grain-platform, and the bracket connecting it with the main frame, substantially as and for the purpose hereinbefore set forth.

3. The combination, substantially as hereinbefore set forth, of the main frame, the finger-beam having bracket connection with the main frame, the grain-platform frame having bracket connection with the main frame, and the brace-rods connecting the finger-beam and grain-platform frame with the main frame, for the pupose described.

4. The combination of the main frame, the finger-beam, the bracket connecting the finger-beam with the main frame, the back beam of the grain-platform, the bracket connecting it with the main frame, the brace-rod secured to the finger-beam bracket and main frame, and the brace-rod secured to the back beam-bracket and main frame, substantially as and for the purpose hereinbefore set forth.

5. The combination, with the main frame composed of the bent main bar, the intermediate bar, and the brace-bar, of the finger-beam, the bracket connecting the finger-beam with the main frame, the brace-rod connecting the finger-beam with the brace-bar of the main frame, the back beam of the grain-platform, the bracket connecting the back beam with the main frame, and the brace-rod connecting the back beam with the rear of the main frame at the junction of the rear end of the intermediate bar with the main bar of the frame, substantially as and for the purpose hereinbefore set forth.

6. The combination of the driving-wheel, its axle, the main frame having vertically adjustable connection with the axle, the finger-beam and platform-frame having rigid connection with the main frame, the grain-wheel, its rocking journal-bracket, the controlling-lever pivoted to the main frame, projecting at its front end beneath the axle and flexibly connected at its rear end with the journal-bracket, and adjusting mechanism for raising and lowering the main frame on the axle, substantially as and for the purpose hereinbefore set forth.

7. The combination of the driving-wheel, its axle, the main frame having vertically-adjustable connection with the axle, the mechanism for raising and lowering the main frame, the finger-beam and grain-platform frame rigidly connected with the main frame, the controlling-lever pivoted to the main frame and projecting at its front end beneath the axle, the chain secured to the rear end of the controlling-lever, the guide-pulley having supporting connection with the main frame and beneath which the chain passes, the guide-pulley having connection with the outer end of the grain-platform frame and beneath which the chain passes, the rocking journal-bracket having pivotal connection with the finger-beam, and provided with the segment-sheave over which the chain passes, and to which it is secured, and the grain-wheel mounted upon the arm of the journal-bracket, substantially as and for the purpose hereinbefore set forth.

8. The combination of the vertically-adjustable main frame, the finger-beam rigidly connected therewith, the rocking journal-bracket pivotally connected with the finger-beam and carrying the grain-wheel, the chain connected to said bracket, the grain-platform frame rigidly connected with the main frame and beneath which the chain passes, the guide-pulleys for the chain, supported by connection with the platform-frame and main frame, and the vertically-rocking controlling-lever pivoted to the main frame, having the chain attached to it, and controlled in its movements by the adjustment of the main frame, substantially as and for the purpose hereinbefore set forth.

In testimony whereof I have hereunto subscribed my name.

FREDERICK G. BECKER.

Witnesses:
H. C. HAMMOND,
GEO. C. WILLIAMS.